United States Patent [19]

Davis et al.

[11] Patent Number: 4,683,246
[45] Date of Patent: Jul. 28, 1987

[54] POLYURETHANE FOAM-FIBER COMPOSITES

[75] Inventors: Gregory B. Davis, Monkton; Michael S. Buchanan, Baltimore, both of Md.

[73] Assignee: Wm. T. Burnett & Co., Inc., Baltimore, Md.

[21] Appl. No.: 839,714

[22] Filed: Mar. 14, 1986

[51] Int. Cl.$^4$ .......................... C08J 9/36; C08L 75/00
[52] U.S. Cl. ...................................... 521/54; 521/137
[58] Field of Search ............... 428/317.9, 327; 521/53, 521/54, 55, 137

[56] References Cited

U.S. PATENT DOCUMENTS

| | | | |
|---|---|---|---|
| 2,147,362 | 2/1939 | Bloomberg | 521/54 |
| 3,256,218 | 6/1966 | Knox | 521/54 |
| 3,894,973 | 7/1975 | Yunan | 521/54 |
| 4,438,220 | 3/1984 | Fracalossi et al. | 521/55 |
| 4,438,221 | 3/1984 | Fracalossi et al. | 521/55 |

FOREIGN PATENT DOCUMENTS 146767 12/1978 Japan ................................ 428/317.9

Primary Examiner—William J. Van Balen
Attorney, Agent, or Firm—A. W. Breiner

[57] ABSTRACT

Polyurethane foam-fiber composite structures comprising a flexible polyurethane foam uniformly mixed with a fibrous material and bonded with a liquid flexible resinous binding agent to provide a cured foam structure; the relative amounts of materials in the foam structure being such that for each 100 parts by weight of polyurethane foam particles about 10 to 500 parts of fibrous material and about 10 to 250 parts of binding agent is employed, the fibrous material having a fiber length of from $\frac{1}{8}''$ to 4'' and preferably $\frac{1}{4}''$ to $\frac{3}{4}''$, a density of at least 0.75, and a diameter of less than 500 microns. The foam structures have an excellent sag factor with good resiliency for a select density.

33 Claims, No Drawings

POLYURETHANE FOAM-FIBER COMPOSITES

This application is related to commonly assigned U.S. Pat. Nos. 4,438,220 and 4,438,221, and co-pending U.S. application Ser. No. 06/696,523 filed Jan. 30, 1985 now U.S. Pat. No. 4,591,469.

This invention relates to polyurethane foam-fiber composites. More particularly, this invention relates to polyurethane foams containing natural or synthetic fibers in an amount sufficient to provide a foam having controlled density, strength, and resiliency characteristics, and tailored to have specific properties including combustion-retardant properties, and the like.

The usage of polyurethane foams for various applications including as a cushioning or padding material has greatly increased in the last ten to twenty years, primarily due to the excellent physical properties of polyurethane foams. Polyurethane foams are available having soft and resilient characteristics rendering them useful, for example, in pillows and blankets. Other polyurethane foams have moderate load-bearing characteristics and as a result are widely used, for example, as seatings in furniture and as fillings for mattresses. Still other polyurethane foam compositions are relatively firm and find application in men's and women's apparel, packaging, thermal and acoustical insulation, and carpet underlay. The versatility and quality of the products that can be manufactured from polyurethane foam are related to the advances that have been made in the chemistry of polyurethane raw materials and in the technology that has evolved in the formulation and processing of materials into satisfactory and needed products.

While the marketplace for polyurethane foams has witnessed innovations and improvements which have led to greatly expanded usage of polyurethane foams, there has been a need in various markets to lower the price of polyurethane foams without detracting from the recognized desirable characteristics of a polyurethane foam. One modification made in an effort to lower the price has been the incorporation of fillers, including fibrous materials, in the polyurethane foam. Specifically, U.S. Patent No. 3,582,500 discloses a process for the manufacture of a product of polyurethane foam reinforced by fibers. According to the patent, a homogeneous polyurethane foam product containing dispersed fibers distributed throughout the mass of foam is prepared by mixing a polyol, a polyisocyanate and additives including the fiber, and then foaming the material in situ. Foams having a filler material incorporated therein at the time of foaming suffer losses in strength and appearance, and lead to processing difficulties. U.S. Pat. No. 3,764,428 discloses a modified process for making a foamed product comprising an expanded fibrous fleece and a foamed synthetic resin wholly filled throughout the interstices among the fibers. The fibrous fleeces can be fibers such as cotton and cotton waste, or synthetic fibers such as polyester fibers. According to the method described, a powdery resin composition is uniformly sprinkled over a layer of the fibrous fleece. Thereafter, the material in layers is heated under pressure to foam and cure the powdery resin. These products, while having certain advantageous characteristics, substantially lose the properties of a polyurethane foam.

Another proposal for lowering the price of foam is to rebond waste foam chips. Thus, rebonded polyurethane foam has been made in the prior art by shredding and/or grinding waste polyurethane foam to form polyurethane foam particles, mixing the polyurethane foam particles with a binder, and then curing the binder either at atmospheric pressure, or under reduced pressure, with or without added heat energy, for effecting cure of the binder. The resultant foams normally have relatively high and often non-uniform densities and, because of the appearance of the product, have been used primarily where the foam is not readily seen as, for example, as carpet underlay and the like. When fabricating rebonded foam it was possible to incorporate only relatively low amounts of solid materials into the foam to modify the foam structure, including the addition of only low amounts of combustion retardant materials to render the resultant foam combustion retardant. If larger amounts of solid materials were added, the resultant foam would have poor physical characteristics. As a modification of a rebonded foam structure, U.S. Pat. No. 3,790,422 describes a process for the agglomeration of expanded polyurethane flakes comprising compressing the flakes at high pressures and temperatures whereby, according to the theory stated in the patent, the polyurethane foam flakes achieve an unstable equilibrium and free isocyanate radicals are formed, which radicals react at the high temperatures and pressures with the hydroxyl radicals in adjacent flakes. As one embodiment, textile fibers such as cotton, nylon or polyesters containing isocyanate reactive groups are added to the flakes to increase mechanical strength. It is theorized that the free hydrogen radicals of the textile fibers, because of the high pressures and temperatures, react with the newly formed —NCO groups to form a compressed product. Due to the conditions employed, the properties of the foam products will be determined by the interreaction of the —NCO radicals formed and the isocyanate reactive groups which are available to provide a product with a chemical bonding together of the adjacent polyurethane foam flakes.

A further modified rebonded structure is described in U.S. Pat. Nos. 3,894,973 and 4,014,826 where a particular type of synthetic material is utilized in combination with a shredded elastomeric foam, such as a polyurethane foam. The synthetic organic fibers known under the name pneumacel fibers are a very low-density cellular fiber composed predominantly of small, polyhedral-shaped, closed cells; with the cells being defined by thin, film-like walls of polymer. Gas contained within the cells contributes to the thickness and pneumatic properties of the cellular fibers. The fibers have very low densities, i.e., about 0.01 g/cc or less; and have a relatively large diameter, i.e., in the range of about 1 mm or 1000 microns. Essentially the pneumatic fibers, being gas-containing closed cells, are more similar in structure to foam particles than to textile fibers. Although these foam products are said to have good structural properties, because of the uniqueness of the pneumacel fibers, these foam products can have only limited application. Additionally, the structures, similar to foam structures containing polystyrene foam beads, will be very stiff or boardy.

More recently it has been discovered that shredded and/or finely ground polyurethane foam could be used in making polyurethane foam buns or slabs having relatively high amounts of solid materials by foaming particles of existing polyurethane foam and solid particles of an additive, including fire retardant materials, with new polyurethane foams. Thus, U.S. Pat. No. 4,438,221, above noted, describes the preparation of foam-filled foam structures obtained through the steps of admixing particles of flexible polyurethane foam with a solid material, uniformly applying to the mixture a liquid, flexible polyurethane foam-forming material containing a reactive polyol and a polyisocyanate, and foaming the foam-forming material with water to provide a flexible foam having bonded therein the polyurethane foam particles and solid material. According to the teaching of the '221 patent, it was possible to incorporate relatively large amounts of solid materials into the polyurethane foam particles while maintaining the integrity and good physical properties of the foam structures. The solid material which can be used in combination with shredded or ground urethane foam as stated in the '221 patent includes graphite, carbon particles, or metal filings such as lead filings to impart characteristics such as conductivity or to improve the sound absorption and acoustical properties; various fillers such as polymer powders, asbestos fibers or particles, sawdust, cork, and pigments to impart various useful characteristics; antistatic additives, or materials such as polyvinylchloride powders to modify the characteristics of the foam to permit dielectric sealing of the foam to other foam surfaces or to surfaces such as polymer films exemplified by polyvinylchloride films; light absorber or light stabilizer powders such as the hindered amines; antioxidants such as the hindered phenols; natural soaps and synthetic detergents including compositions having antibiotic, antiseptic, disinfectant, antiviral, and sterilizing effects; natural or synthetic fibers including cotton fibers, glass fibers, or the like to modify the structural strength of the foam products; beads including glass beads, organic polymer beads such as polystyrene beads, inorganic beads such as alumina bubbles to increase the volume of the foams while controlling lightness in weight; ground rubber or ground elastomeric materials to add enhanced characteristics to the foam, as well as combustion and flame-retardant materials. U.S. Pat. No. 4,438,220, above noted, also describes foam-filled polyurethane foam structures of the type described in the '221 patent. In the '220 patent the solid materials which are incorporated are specifically combustion retardant materials to provide polyurethane foam structures having enhanced combustion retardant characteristics. application Ser. No. 06/696,523 relates to an improved process for making foam-in-foam polyurethane foams. Each of the aforesaid patents, i.e., U.S. Pat. Nos. 4,438,220 and 4,438,221, and application Ser. No. 06/696,523, are assigned to Wm. T. Burnett & Co., Inc., the assignee of the present application.

Although the aforesaid '220 and '221 patents and application Ser. No. 06/696,523 describe new compositions of matter and methods of making foams which are highly meritorious, it has now been discovered that a particularly desirable foam both from the standpoint of economics and from the standpoint of physical characteristics can be obtained by bonding together with a binder composition, preferably a polyurethane foam-forming binder, polyurethane foam chips, and natural or synthetic fibers such as but not limited to fibrous cotton, wool, or polyester fibers. Surprisingly, it has been found that the fibers make up for certain shortcomings in polyurethane foam; and that the polyurethane foam contributes to and makes up for the shortcomings of conventional fibrous products. For example, cotton fibers are known to compact and dish out, i.e., the fibers will realign and spread out, in time, leading to a thin, non-resilient layer. Polyurethane foam, on the other hand, although being resilient, has relatively limited bulk and mass, and accordingly bottoms out when compressed especially in the low densities. Conventional low density urethane foams have sag factors of 1.5 to 2; whereas low density versions of the product obtained with a combination of foam and fibers according to this invention can achieve a sag factor of 2.5 to 6. Sag factor, as used herein, is the ratio of ILD (indentation load deflection) at 65% of original height versus 25% of original height. Sag factor, also referred to in the furniture industry as a support factor, preferably is at least 2.0 and desirably is as high as possible within limits. Thus, rebonded foams are designed to achieve high sag factor and low load curves, but accomplish this at a much higher density. In the structures of the present invention, the polyurethane foam chips augment the characteristics of the cotton fibers in that the foam chips prevent the cotton fibers from compacting, and the cotton fibers augment the characteristics of the polyurethane foam chips in that the cotton fibers impart bulk and mass and prevent bottoming out. Accordingly, a composition made up from a combination of polyurethane foam chips and cotton fibers will provide a high sag factor at much lower densities, which is a weight and cost advantage.

In a similar manner other fibrous materials can be utilized to tailor a foam product to a particular application. Wool fibers will impart characteristics to the foam different from the characteristics imparted by cotton. Thus, wool does not have the same compacting characteristics as cotton and will, since it is a softer and more resilient fiber, impart a softer hand to the foam structure. Wool fibers, however, will prevent compaction to the extent desirable and, furthermore, will improve the density and strength characteristics of a polyurethane foam. Synthetic fibers, such as a polyester fiber again will provide unique characteristics to the foam such as firmness, high resiliency, and hydrophobicity. Other fibers, such as jute, hemp and sisal will impart bulk and mass without detracting from the desirable foam characteristics, which is a substantial economic advantage.

OBJECTS AND GENERAL DESCRIPTION OF THE INVENTION

Accordingly, it is a primary object of the present invention to provide polyurethane foam products having good bulk and mass at a lower density.

It is another object of the present invention to provide a polyurethane foam product containing natural and synthetic fibers in varying amounts which permits the control of the bulk and mass of the foam product as well as control of flexibility, resiliency, density, and strength.

It is another object of the present invention to provide a polyurethane product having good bulk and mass which is low in cost.

It is another object of the present invention to provide a polyurethane foam product containing cotton fibers in varying amounts which permits the control of the bulk and mass of the foam product as well as control of flexibility, resiliency, density, and strength.

It is another object of the present invention to provide a polyurethane foam product containing wool fibers in varying amounts which permits the control of the bulk and mass of the foam product as well as control of flexibility, resiliency, density, and strength.

It is another object of the present invention to provide a polyurethane foam product containing polyester fibers in varying amounts which permits the control of the bulk and mass of the foam product as well as control of flexibility, resiliency, density, and strength.

The aforesaid objects and others are realized by providing an admixture of shredded or ground polyurethane foam and natural or synthetic fibers; and thereafter binding the admixture with a resinous component, preferably a polyurethane foam-forming composition comprising the reaction product of a polyisocyanate and reactive polyol foamed with added water. The polyurethane foam particles and fibers are adhesively bonded into dimensionally stable, molded configurations. The characteristics of the products can be varied substantially, as will be developed hereinafter, by varying the amount and kind of fibers in the composition relative to the foam chips and binder. In any event, however, within the critical limits herein defined all of the compositions have superior mass and bulk characteristics. The products of the present invention utilizing foam chips in combination with fibers have unique advantages not obtained when fibers are incorporated into the foam in situ during manufacture. When the fibers are incorporated in situ during manufacture, in addition to requiring special processing equipment, the fibers detract from structural strength and provide foams with poor appearance, including holes or fissure in the foam. Such foams have a non-uniformity of strength as a result of the randomly distributed fibers within the foam. Using chips, the cell structure is uniformly distributed with the fibers located around the preformed particles of foam. As a result, it is possible to obtain foams having good support characteristics at low densities.

The fibers which are useful herein are the natural fibers such as cotton, wool, silk, hemp, flax, jute, and sisal. The synthetic fibers which can be utilized are polyester fibers, nylon fibers, olefin fibers, rayon fibers, carbon fibers, aramid fibers, as well as other synthetic fibers made from various different chemicals as are known in the art. It has been found that the length of the fibers is critical within certain ranges. Thus, fibers having a length below about ⅛" do not contribute substantially to the physical characteristics of the foam; whereas fibers having a length above about four (4") inches are undesirable in that they have a tendency to ball when mixed with the polyurethane foam chips and, accordingly, do not provide the uniformity and strength characteristics desired. Preferably the fibers will have a length of from about ¼" to 1½", and optimally a length of from about ¼" to ¾". Further, it has been found that the fibers should have a select density in relation to the diameter of the fibers. It has been found that the fibers should have a density of at least about 0.75 and a diameter of less than about 500 microns. A preferred range is a density of at least 0.90 and a diameter of less than about 100 microns. Thus, cotton fibers conventionally have a diameter in the range of 16 to 20 microns; flax conventionally has a diameter of about 12 to 16 microns; wool conventionally has a diameter of about 10 to 50 microns, and silk conventionally has a diameter of about 11 to 12 microns. Further, cotton has a density (g/cc) of about 1.52; flax a density of about 1.52; silk a density of about 1.25, and wool a density of about 1.32. Most synthetic or man-made fibers have a density in the range of 0.91 to about 1.75. The characteristics of natural and synthetic fibers are set forth in *Textiles* by Norma R. Hollen et al, Fifth Edition, 1979, Macmillan Publishing Co., Inc., New York, at Chapter 2, "Textile Fibers and Their Properties," pages 4-17. The aforesaid publication is incorporated herein by reference.

The selection of the fibers as well as the length of the fibers permits a modification of product characteristics and permits the tailoring of the foam product to meet a particular need. A length greater than about ⅛" is desirable in order to obtain the unique strength characteristics as above stated. A length above about 4", also as above stated, will have an adverse effect on the uniformity of the foam structure in view of the difficulty of having the fibers properly distributed in linear fashion. The fibers at the longer lengths have a tendency to ball. For this reason the length is preferably 1½" or less, and still more preferably the length should be ¾" or less than ¾". The fibrous material which can be used according to this invention can be first-grade fibers such as first-grade wool, silk, cotton, or synthetic fibers such as the polyesters, or waste materials can be used. It is to be recognized that waste materials are normally not as desirable in that it is more difficult to control the characteristics of the foam when using fibrous materials where the composition is not readily ascertained. As an example, it has been found that first-grade cotton fibers recovered from a cotton gin will provide exceptional bulk and mass characteristics which are reproducible. However, from the standpoint of cost, it is preferable to use waste or by-products of the process for making cotton into cloth, such as the "linters" which are short fibers or the "pickers" which are long fibers. The ability to use by-products of the cotton clothmaking process substantially reduces the cost, but the final product may be less reproducible. The application of the ultimate foam product will determine the cotton fibers selected for use. Similarly, considerations apply to the selection of other fibers.

The shredded or ground flexible polyurethane foam as well as the foam binder used to bond the particles of foam and solid materials to form a foamed structure suitable for use according to the present invention are derived from reactive hydroxy-terminated polyester or polyether polyols which are reacted with organic polyisocyanates in the presence of suitable catalysts, surfactants, and blowing agents. To obtain a flexible foam, it is necessary to foam with some water.

The proportions of fibers to foam can vary over a substantial range and obtain the desirable characteristics in the foam. It has been found, however, that for each 100 parts of polyurethane foam chips, the fibers should be used in an amount of from about 10 to 500 parts, preferably 25 to 200 parts, and optimally from about 50 to 150 parts. The binder is preferably a polyurethane foam binder. However, other binders can be employed, including the non-foam polyurethane binders, the resinous acrylates, latex binders, and epoxy air-drying or heat-setting resins. The amount of binder for 100 parts of polyurethane foam chips is preferably from 10 to 250 parts. It has been found that the binder promotes product resiliency. Preferably, therefore, when using the larger amounts of fiber, larger amounts of the binder should also be used.

While the products of the present invention have highly useful application without additional solids, it is possible to include in the product other solids and particularly solids which contribute to the combustion-retardant characteristics, such as defined in above-noted U.S. Pat. No. 4,438,220. Alternatively, the product can include additional fillers such as described in U.S. Pat. No. 4,438,221 to provide modified characteristics to the foam product. When utilized, the amount of additional solids can vary substantially; it being recognized, however, that normally when the solid content is increased the fiber content may necessarily be lowered in order to provide a foam having the necessary structural integrity and strength. Because of the manner in which the solid materials are admixed with the pre-formed foam particles and then refoamed, the physical characteristics of the foam can be carefully controlled to provide the physical characteristics essential for meeting various applications.

Foam products according to the present invention are made by providing a mixture of the select fibers with shredded polyurethane foam or polyurethane foam chips, and then applying resinous binder, preferably a polyurethane foam composition, to the mixture; and thereafter curing the mixture in the presence of heat and in the event the binder is a polyurethane foam-forming binder in the presence of water to provide a foaming action. The product is shaped in a suitable mold. A preferred apparatus and method are described in the above-noted application Ser. No. 06/696,523.

PRESENTLY PREFERRED EMBODIMENTS

Presently preferred embodiments for producing foam products according to the present invention are as follows: A pre-polymer mix comprising a polyether polyol having a molecular weight in the range of about 3000 to 6500 is mixed with toluene diisocyanate in a weight ratio of 68% polyol and 32% toluene diisocyanate. The mixture includes minor amounts of a surfactant component, i.e., organo silicone compounds. Additional foam-forming formulations which are suitable for use according to the present invention are described in earlier-referred to U.S. Pat. Nos. 4,438,220 and 4,438,221, incorporated herein by reference.

The pre-polymer mix is charged to a sprayer unit and heated. Foam and natural or synthetic fibers in an amount as defined in the specific examples are charged to a shredder and shredded to provide a uniform mixture. While rotating the mixture of foam chips and fibers, the above prepared pre-polymer in the amount stated in the specific examples are sprayed onto the foam chips and fibers to obtain a uniform blending. After the blending, the mixture is charged to a mold, with the chips being distributed to provide a slightly increased height of chips at the edges of the mold. The mold is closed and curing is accomplished with steaming. A preferred method of forming the foam buns is defined in above-noted application Ser. No. 06/696,523.

EXAMPLES

In the following preferred examples, Examples 1–11 do not contain solids other than fibers and do not contain combustion retardants. Examples 12–16 contain varying amounts of liquid flame retardants and solids other than the cotton fibers. Parts are by weight unless otherwise specified.

Example 1

(Batch #6265)

| Components | Parts |
| --- | --- |
| Polyether Urethane Foam Chips ⅜" | 227 |
| Cotton Linters | 681 |
| Pre-Polymer | 227 |
| Methylene Chloride (Solvent) | 100 |
| Total | 1235 |

This foam is characterized in that the mass properties of the cotton impart an extremely high sag factor for a 2 lb/ft$^3$ density material. The foamlike resiliency is less since the cotton is the dominant material. The high binder level lends strength to the product.

Example 2

(Batch #6148)

| Components | Parts |
| --- | --- |
| Polyether Urethane Foam Chips ⅜" | 946 |
| Cotton Linters | 95 |
| Pre-Polymer | 95 |
| Methylene Chloride (Solvent) | 100 |
| Total | 1236 |

This foam is characterized in that the dominance of foam in this product leads to a more resilient product which has a slightly higher sag factor than a purely foam product. The cotton functions as a highly efficient filler and adds to the resilience of the product.

Example 3

(Batch #6074)

| Components | Parts |
| --- | --- |
| Polyether Urethane Foam Chips ⅜" | 590 |
| Cotton Linters | 393 |
| Pre-Polymer | 152 |
| Methylene Chloride (Solvent) | 100 |
| Total | 1235 |

This foam is characterized in that this product has a sag factor in excess of 4.0 when a foam product of similar density without the fibers would have a sag factor of less than 2.5 The product has excellent physical properties, including tensile sile and tear strength. The product has good resiliency although being more "boardy" than the product of Example 2.

Example 4

(Batch #5976)

| Components | Parts |
| --- | --- |
| Polyether Urethane Foam Chips ⅜" | 329 |
| Cotton Linters | 660 |
| Pre-Polymer | 292 |
| Methylene Chloride (Solvent) | 100 |
| Total | 1381 |

This foam is similar to the material of Example 1 in that it has an extremely high sag factor and a "boardy" feel. It has excellent strength provided by the high level of polyurethane binder. The tear strength is greater than 1.2 ppi.

Example 5

(Batch #5972)

| Components | Parts |
| --- | --- |
| Polyether Urethane Foam Chips ⅜" | 329 |
| Cotton Linters | 660 |
| Pre-Polymer | 146 |
| Methylene Chloride (Solvent) | 100 |

-continued

| Components | Parts |
|---|---|
| Total | 1235 |

This foam is characterized in that it has properties somewhat similar to cotton batting because of the relatively low level of polyurethane binder. Higher levels of cotton require increased binder where strength is important. The tear strength is less than 0.3 ppi.

Example 6

(batch #6266)

| Components | Parts |
|---|---|
| Polyether Urethane Foam Chips ⅜" | 315 |
| Cotton Linters | 631 |
| Pre-Polymer | 189 |
| Methylene Chloride (Solvent) | 100 |
| Total | 1235 |

This foam is characterized in that it represents a middle ground between Examples 4 and 5. The tear strength is between 0.3 and 1.2 ppi.

Example 7

(Batch #6264)

| Components | Parts |
|---|---|
| Polyether Urethane Foam Chips ⅜" | 175 |
| Cotton Linters | 701 |
| Pre-Polymer | 259 |
| Methylene Chloride (Solvent) | 100 |
| Total | 1235 |

This foam is similar to Example 1 except that it has greater cotton-like properties and is less resilient and foamlike.

Example 8

(Batch #6020)

| Components | Parts |
|---|---|
| Polyether Urethane Foam Chips ⅜" | 536 |
| Cotton Linters | 233 |
| Polyester Fibers 1.5" | 163 |
| Pre-Polymer | 181 |
| Methylene Chloride (Solvent) | 100 |
| Total | 1213 |

This foam is characterized in that the polyester fibers being more resilient than cotton add more body to the product. The sag factor is abouve 3.5, and the tensile and tear strength are better than Example 3.

Example 9

(Batch #60099)

| Components | Parts |
|---|---|
| Polyether Urethane Foam Chips ½" | 613 |
| Modacrylic Fiber (Acrylic fiber modified to be flame retardant) | 307 |
| Pre-Polymer | 200 |
| Methylene Chloride (Solvent) | 100 |

-continued

| Components | Parts |
|---|---|
| Total | 1220 |

This foam is charatcerized in that it has a low density with a high sag factor.

Example 10

(Batch #60019)

| Components | Parts |
|---|---|
| Polyether Urethane Foam Chips ½" | 655 |
| Polyester Fibers ¾" | 328 |
| Pre-Polymer | 200 |
| Methylene Chloride (Solvent) | 100 |
| Total | 1283 |

This foam is characterized in that it has a very high ILD and excellent resiliency.

Example 11

(Batch #60096)

| Components | Parts |
|---|---|
| Polyether Urethane Foam Chips ½" | 684 |
| Polyester Fibers ½" | 171 |
| Pre-Polymer | 139 |
| Methylene Chloride (Solvent) | 100 |
| Total | 1094 |

This foam is characterized in that it is very soft with an ILD greater than the same foam without the fiber.

Example 12

(Batch #6127)

| Components | Parts | |
|---|---|---|
| Polyether Urethane Foam Chips ½" | 1244 | |
| Cotton Linters | 351 | |
| Pre-Polymer | 512 | |
| Methylene Chloride (Solvent) | 200 | |
| Flame Retardants: | | |
| Alumina Hydrate | 1024 | |
| Decabromodiphenyl Oxide | 249 | |
| Antimony Trioxide | 113 | |
| Tetrakis(2-chloroethyl) | 256 | |
| Tris(2-chloroethyl)-Phosphate | 59 | |
| Boric Acid | 110 | 1811 |
| Total | | 4118 |

This foam is characterized in that this foam, run at a density of 5 lbs/ft³, demonstrated superb flammability properties, and was specifically designed to conform to miltary specifications, especially Mil-R-0020092J(SH). The flammability properties are as follows:

ASTM—162—Flame Spread Index less than 10

ASTM—662—½" Smoke Density less than 200 Dm

In addition, the product is extremely resilient and has excellent strength.

Example 13

(Batch #6087)

| Components | Parts | |
|---|---|---|
| Polyether Urethane Foam Chips ½" | 153 | |
| Cotton Linters | 77 | |
| Pre-Polymer | 54 | |
| Methylene Chloride (Solvent) | 12 | |
| Flame Retardants: | | |
| Antimony Trioxide | 9 | |
| Boric Acid | 52 | |
| Chlorinated Paraffin | 26 | |
| Melamine | 9 | |
| Tetrakis(2-chloroethyl) | 18 | 114 |
| | Total | 410 |

This foam is characterize in that this foam has demonstrated excellent flammability properties on test as follows:

ASTM—3675 — Flame Spread Index less then 25
ASTM—662 —½" Smoke Density less tha 175 Dm The product has good physical properties and a high sag factor (4.0+).

Example 14

(Batch #6304)

| Components | Parts | |
|---|---|---|
| Polyether Urethane Foam Chips ⅜" | 193 | |
| Cotton Linters | 95 | |
| Pre-Polymer | 56 | |
| Methylene Chloride (Solvent) | 12 | |
| Flame Retardants: | | |
| Antimony Trioxide | 13 | |
| Boric Acid | 65 | |
| Chlorinated Paraffin | 33 | |
| Decabromodiphenyl Oxide | 22 | |
| Tris(2-chloroethyl)-Phosphate | 15 | 148 |
| | Total | 504 |

This foam is characterized in that this material is very similar to the material of Example 13. Its flammability properties are as follows:

ASTM—E162(or 3675)—Flame Spread Index less than 10
ASTM—662—½" Smoke Density les than 175 Dm

Example 15

(Batch #60067)

| Components | Parts | |
|---|---|---|
| Polyether Urethane Foam Chips ⅜" | 650 | |
| Cotton Linters | 160 | |
| Wool | 160 | |
| Pre-Polymer | 220 | |
| Methylene Chloride (Solvent) | 40 | |
| Flame Retardants: | | |
| Antimony Trioxide | 44 | |
| Boric Acid | 219 | |
| Urea | 60 | |
| Chlorinated Paraffin | 111 | |
| Decabromodiphenyl Oxide | 74 | |
| Tris(2-chloroethyl)-Phosphate | 62 | 570 |
| | Total | 1800 |

This foam is characterized in that the blend of wool and cotton gives a slightly lower sag factor than obtained with cotton only, but with a greater resiliency. The product has excellent resistance to combustion.

Example 16

(Batch #60039)

| Components | Parts | |
|---|---|---|
| Polyether Urethane Foam Chips ¾" | 667 | |
| Wool | 328 | |
| Pre-Polymer | 193 | |
| Methylene Chloride (Solvent) | 200 | |
| Flame Retardants: | | |
| Antimony Trioxide | 45 | |
| Boric Acid | 225 | |
| Chlorinated Paraffin | 114 | |
| Decabromodiphenyl Oxide | 76 | |
| Tris(2-chloroethyl)-Phosphate | 52 | 512 |
| | Total | 1900 |

This foam is characterized in that it is soft with good resiliency. The product has good resistance to combustion.

In the above examples the fibrous material can be replaced with other fibrous materials including wool, hemp, jute, sisal, coconut fiber, and man-made synthetic fibers in order to provide specific characteristics in the foam product. Additionally, other modifying substances including graphite, carbon particles, perfumes and the like can be incorporated, again to provide specific and tailored characteristics to the foam products. The materials incorporated in addition to the fibers are not critical other than to the extent that they must be inert to the foam and the foam-forming reactants. It is essential, however, for the desirable characteristics in the foam product that the fibrous material have a length of from about ⅛" to about 4", preferably ¼" to 1½", and optimally ¼" to ¾"; a density of at least 0.75, preferably 0.90 to 1.75; and a diameter of less than about 500 microns, and preferably less than 100 microns.

As will be apparent to one skilled in the art, various modifications can be made within the scope of the aforesaid description. Such modifications being within the ability of one skilled in the art form a part of the present invention and are embraced by the appended claims.

It is claimed:

1. A polyurethane foam-fiber composite structure obtained through the steps of (a) providing an admixture of flexible polyurethane foam and a fibrous material; (b) uniformly applying to said mixture of (a) a liquid flexible resinous binding agent, and (c) curing said composition of (b) so as to provide a cured foam structure; the relative amounts of materials in said foam structure being such that for each 100 parts by weight of polyurethane foam particles about 10 to 500 parts of fibrous material and about 10 to 250 parts of binding agent is employed, said fibrous material having a fiber length of from ⅛" to 4", a density of at least 0.75, and a diameter of less than 500 microns.

2. The structure of claim 1 wherein said binding agent is a liquid flexible polyurethane foam-forming material containing a reactive polyol and a polyisocyanate, and in the curing of step (c) the foam-forming material is foamed with water to provide a flexible foam having bonded therein said polyurethane foam particles and said fibrous material.

3. The structure of claim 2 wherein said fibrous material has a fiber length of from about $\frac{1}{4}''$ to $1\frac{1}{2}''$, a density of from 0.90 to 1.75, and a diameter of less than about 100 microns.

4. The structure of claim 3 wherein said fibrous material has a fiber length of from about $\frac{1}{4}''$ to $\frac{3}{4}''$.

5. The structure of claim 3 wherein said fibrous material is cotton.

6. The structure of claim 3 wherein said fibrous material is wool.

7. The structure of claim 3 wherein said fibrous material is polyester.

8. The structure of claim 3 wherein said particles of polyurethane foam are obtained as the reaction product of a polyether polyol and a polyisocyanate foamed with water.

9. The structure of claim 3 wherein said particles of polyurethane foam are obtained as the reaction product of a polyester polyol and a polyisocyanate foamed with water.

10. The structure of claim 3 wherein said liquid flexible foam-forming material contains a reactive polyester polyol.

11. The structure of claim 3 wherein said liquid flexible foam-forming material contains a reactive polyether polyol.

12. The structure of claim 1 wherein the relative amounts of materials in said foam structure are such that for each 100 parts by weight of polyurethane foam particles about 25 to 200 parts by weight of fibrous material and about 10 to 250 parts by weight of binding agent is employed.

13. The structure of claim 1 wherein the relative amounts of materials in said foam structure are such that for each 100 parts by weight of polyurethane foam particles about 50 to 150 parts by weight of fibrous material and about 10 to 250 parts by weight of binding agent is employed.

14. The structure of claim 4 wherein the relative amounts of materials in said foam structure are such that for each 100 parts by weight of polyurethane foam particles about 25 to 250 parts by weight of fibrous material and about 10 to 250 parts by weight of binding agent is employed.

15. The structure of claim 4 wherein the relative amounts of materials in said foam structure are such that for each 100 parts by weight of polyurethane foam particles about 50 to 150 parts by weight of fibrous material and about 10 to 250 parts by weight of binding agent is employed.

16. The method of forming a polyurethane foam-fiber composite structure comprising the steps of (a) providing an admixture of a flexible polyurethane foam and a fibrous material; (b) uniformly applying to said mixture of (a) a liquid flexible polyurethane foam-forming material containing a reactive polyol and a polyisocyanate; (c) foaming said foam-forming material of (b) with water to bond said polyurethane foam particles and said fibrous material to provide a foam structure wherein the relative amounts of materials in said foam structure are such that for each 100 parts by weight of polyurethane foam particles about 10 to 500 parts by weight of fibrous material and about 10 to 250 parts by weight liquid foam-forming material are used, said fibrous material being inert to said foam and foam-forming material and having a fiber length of from $\frac{1}{8}''$ to 4'', a density of at least 0.75, and a diameter of less than 500 microns.

17. The method of claim 16 wherein said fibrous material has a fiber length of from about $\frac{1}{4}''$ to $1\frac{1}{2}''$, a density of from 0.90 to 1.75, and a diameter of less than about 100 microns.

18. The method of claim 17 wherein said fibrous material has a fiber length of from about $\frac{1}{4}''$ to $\frac{3}{4}''$.

19. The method of claim 17 wherein said fibrous material is cotton.

20. The method of claim 17 wherein said fibrous material is wool.

21. The method of claim 17 wherein said fibrous material is polyester.

22. The method of claim 17 wherein said particles of polyurethane foam are obtained as the reaction product of a polyether polyol and a polyisocyanate foamed with water.

23. The method of claim 17 wherein said particles of polyurethane foam are obtained as the reaction product of a polyester polyol and a polyisocyanate foamed with water.

24. The method of claim 17 wherein said liquid flexible foam-forming material contains a reactive polyester polyol.

25. The method of claim 17 wherein said liquid flexible foam-forming material contains a reactive polyether polyol.

26. The structure of claim 1 wherein said structure includes a flame retardant material.

27. The structure of claim 26 wherein the flame retardant material is a solid.

28. The method of claim 16 including the addition of a flame retardant material.

29. The method of claim 28 wherein the flame retardant material is a solid.

30. The method of claim 16 wherein the relative amounts of materials in said foam structure are such that for each 100 parts by weight of polyurethane foam particles about 25 to 200 parts by weight of fibrous material and 10 to 250 parts by weight of liquid foam-forming material are used.

31. The method of claim 16 wherein the relative amounts of materials in said foam structure are such that for each 100 parts by weight of polyurethane foam particles about 50 to 150 parts by weight of fibrous material and 10 to 250 parts by weight of liquid foam-forming material are used.

32. The method of claim 18 wherein the relative amounts of materials in said foam structure are such that for each 100 parts by weight of polyurethane foam particles about 25 to 200 parts by weight of fibrous material and 10 to 250 parts by weight of liquid foam-forming material are used.

33. The method of claim 18 wherein the relative amounts of materials in said foam structure are such that for each 100 parts by weight of polyurethane foam particles about 50 to 150 parts by weight of fibrous material and 10 to 250 parts by weight of liquid foam-forming material are used.

* * * * *

UNITED STATES PATENT AND TRADEMARK OFFICE
CERTIFICATE OF CORRECTION

PATENT NO. : 4,683,246

DATED : July 28, 1987

INVENTOR(S) : Gregory B. Davis et al

It is certified that error appears in the above-identified patent and that said Letters Patent is hereby corrected as shown below:

Column 13, claim 14, line 42, "25 to 250" should read -- 25 to 200 --.

Signed and Sealed this

First Day of March, 1988

Attest:

DONALD J. QUIGG

*Attesting Officer*    *Commissioner of Patents and Trademarks*